Feb. 16, 1971     J. D. STICE     3,563,624
FAMILY ENTERTAINMENT CENTER
Filed July 1, 1969     2 Sheets-Sheet 1
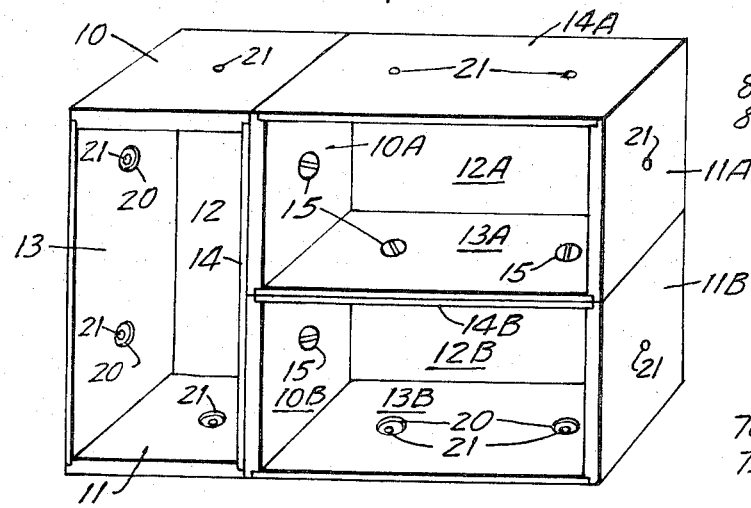
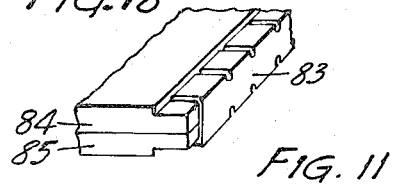
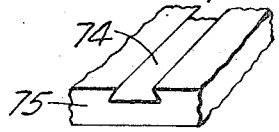
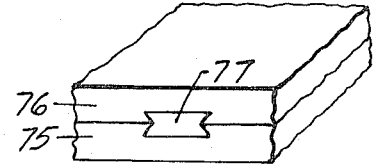
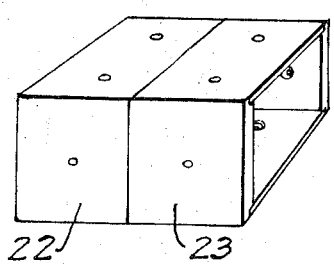
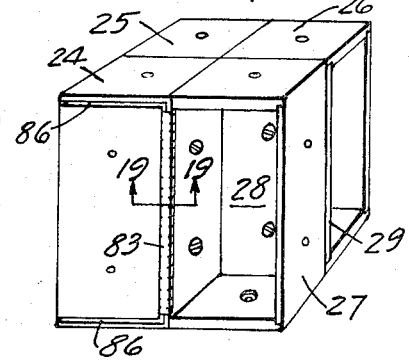
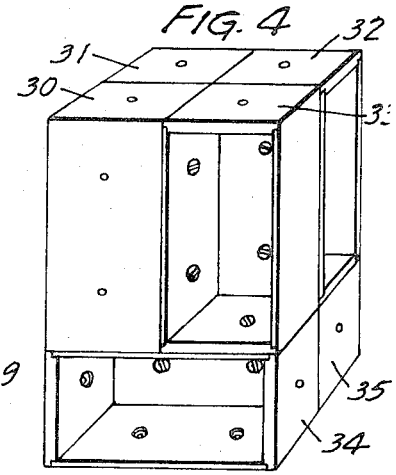
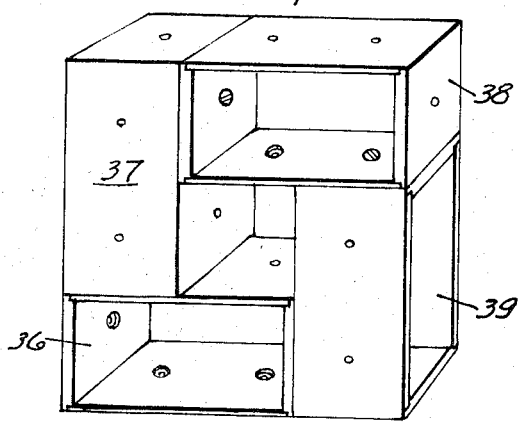
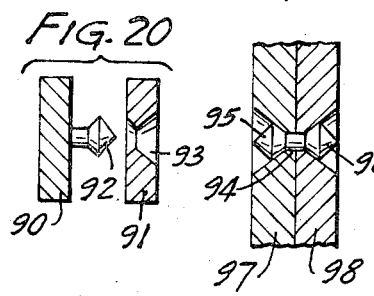
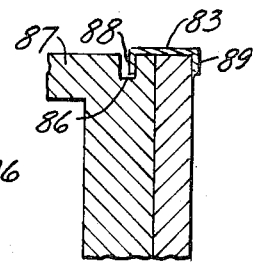
INVENTOR.
JAMES DANIEL STICE
BY
Robert C. Baker
ATTORNEY Feb. 16, 1971     J. D. STICE     3,563,624
FAMILY ENTERTAINMENT CENTER
Filed July 1, 1969     2 Sheets-Sheet 2
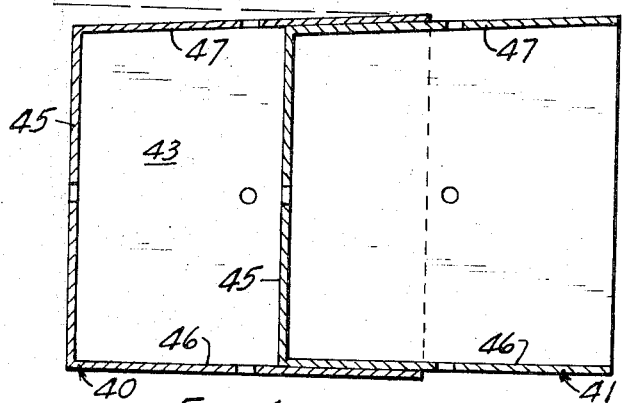
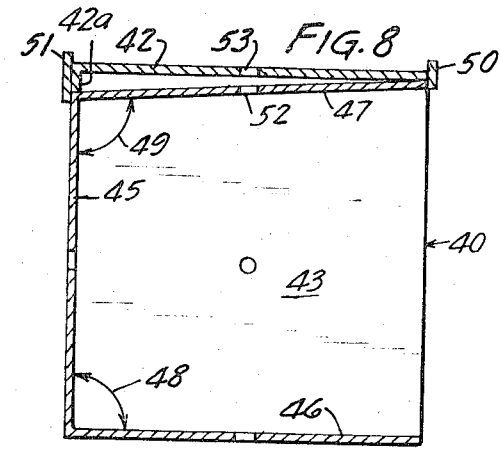
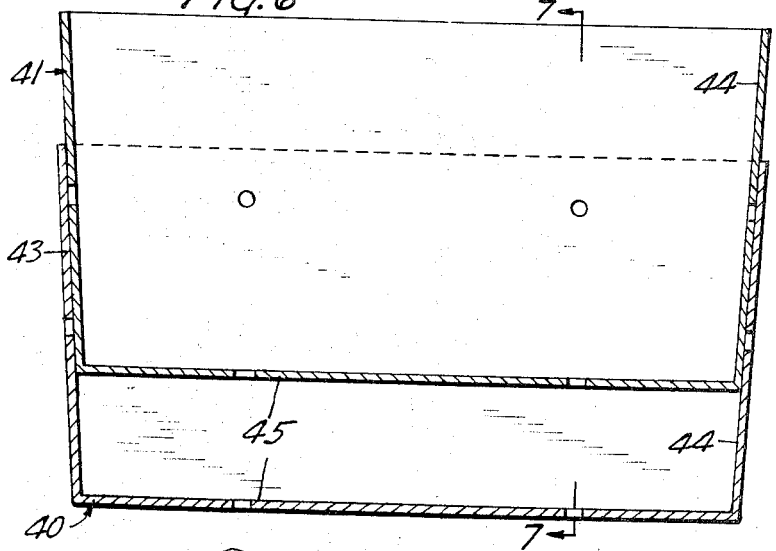
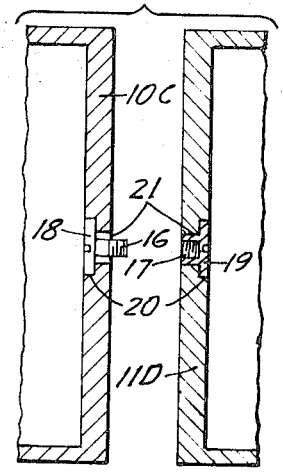
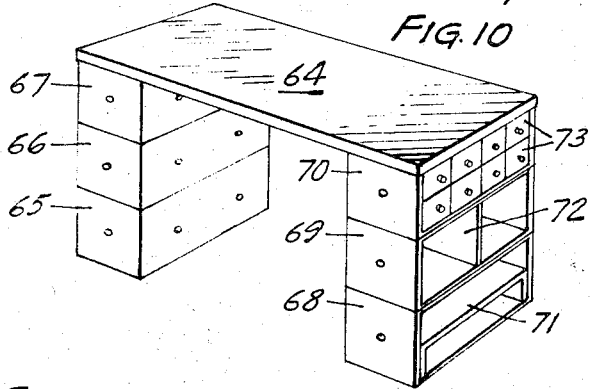
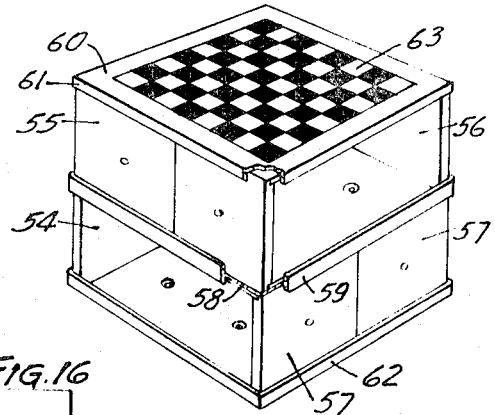
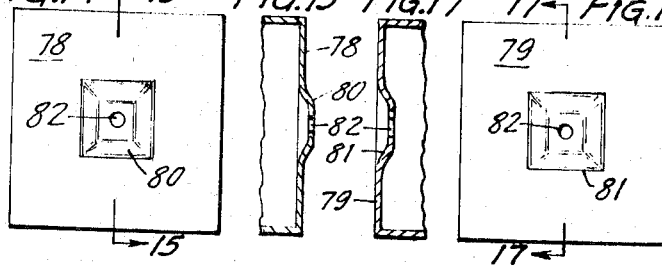
INVENTOR.
JAMES DANIEL STICE
BY
Robert C. Baker
ATTORNEY

United States Patent Office 3,563,624
Patented Feb. 16, 1971

3,563,624
FAMILY ENTERTAINMENT CENTER
James Daniel Stice, 416 S. 4th St.,
Stillwater, Minn. 55082
Filed July 1, 1969, Ser. No. 838,132
Int. Cl. F16b 12/00
U.S. Cl. 312—111     9 Claims

ABSTRACT OF THE DISCLOSURE

New concepts and basic units for utility centers are taught and permit versatile and convenient alteration of the total structure of utility centers as functional needs change. The approach taught is that of forming easily altered "Family Entertainment Centers" for games, arts, crafts, toys, and hobby activities.

The basic units utilized in the invention are receptacles open on one side. They have a volume represented by two cubes adjacent each other. Receptacles other than of two-cube volume are also provided; and these have such a structural relationship between the walls forming the same as to permit ready conversion into receptacles capable of modular mating with those of two-cube volume.

The basic preferred receptacle is one having five outer walls and eight outer-facing module surfaces on those walls. Any modular surface on any one receptacle may be mated to any modular surface of another to form the utility centers.

Disengageable fastening means are also provided to hold modular surface areas in mated position; and a variety of auxiliary items such as game boards and the like are employed in combination with the utility centers to form the total structure characterized herein as a "Family Entertainment Center."

---

This invention relates to new utility structures or centers, and particularly to special receptacle configurations and to means for disengageably fastening or holding two or more such receptacles in a variety of easily-changed modular oriented relationships to form structures in the nature of utility centers. Further, the invention relates to such utility centers in combination with various games, toys, crafts, arts, and hobbies for various age groups. As such, the total concept is that of a "family entertainment center."

The basic unit bodies or structures utilized in the invention are receptacles formed of walls having certain critical relationships and features. These receptacles are open on one side; and in one type of receptacle, the walls of the receptacle are such that the receptacle itself may be looked upon as having a volume of exactly two cubes adjacent each other. A critical feature of these receptacles is that of the modular interrelationship therebetween, as will be discussed. An alternate type of receptacle is also provided; and special members are provided for converting sloped walls of this alternate type of receptacle into a structure capable of modular mating to form utility centers.

The wide versatility of arrangements for receptacles according to the teachings of the invention permits a wide field of usage. Various easily-altered combinations of the basic receptacle structures may be set up for temporary or semi-permanent usage in the home, office, store or factory. The combinations are useful for storage purposes as well as for decorative and for table or other functional purposes. Game tables, desks, tea tables, hobby tables, work centers, display centers, children's play and storage centers, and other structures are easily formed and easily altered at will as functional needs change. Both a surface for performing an activity and storage space for the tools of that activity are provided in a flexibly-arranged form permitting convenient expansion or change of the surface and storage capability at will.

In a large sense, the teaching of the invention is that of a new concept for furniture structures, but with the added feature of versatility of arrangement and use not possible as furniture items have been heretofore conceived and understood in the art. It is the modular nature of the receptacle teaching hereof, together with the disengageable fastening or holding teachings hereof, which make possible this new versatility in the creation and alteration of utility centers or structures. By following the teachings herein, such centers or structures are easily formed, at will, to satisfy specific needs as they arise.

By making the receptacles of the invention in a variety of colors, (e.g., red, yellow, green, blue, etc.) family entertainment centers of great eye appeal and exciting appearance are easily created.

Still further advantages of this new modular approach to furniture, display and storage structures will be evident as this description proceeds.

In further describing the invention, reference is made to a drawing, made a part hereof, wherein:

FIG. 1 is a perspective schematic view of three storage receptacles in a utility center arrangement illustrative of the invention;

FIGS. 2 through 5 inclusive are alternate perspective schematic views of utility centers formed using various combinations of storage receptacles in accordance with the invention;

FIG. 6 is a schematic cross-sectional view illustrating an alternate form for the basic storage receptacle teaching of the invention, and illustrating a "basket" stacking relationship therebetween;

FIG. 7 is a schematic cross-sectional view taken on line 7—7 of FIG. 6;

FIG. 8 is a schematic cross-sectional view through a storage receptacle of the type illustrated in FIGS. 6 and 7, with a leveling attachment;

FIGS. 9 and 10 are perspective views illustrating utility centers of the invention equipped with special plate members;

FIG. 11 is a schematic perspective fragmentary view of an outer wall surface of a receptacle illustrating a dovetailed slot;

FIG. 12 is a schematic perspective fragmentary view of two modular mated and fastened walls of the type shown in FIG. 11;

FIG. 13 is an expanded cross-sectional view, partially in section, illustrating a bolt-type fastening means for modular mated walls of adjacent receptacles;

FIG. 14 is a schematic end elevation of a receptacle illustrating a modified character for the end wall;

FIG. 15 is a cross-sectional view through line 15—15 of FIG. 14;

FIG. 16 is a schematic end elevation of a modified wall cooperative with the wall of FIG. 14 for modular mating;

FIG. 17 is a sectional view through line 17—17 of FIG. 16;

FIG. 18 is a schematic perspective view, partially broken away, illustrating a U-shaped clamp for fastening or holding mated surfaces of adjacent receptacles;

FIG. 19 is a fragmentary sectional view taken on line 19—19 of FIG. 3;

FIG. 20 is an exploded view of a still further alternate form of fastening means for disengageably fastening modular mated walls of receptacles together; and FIG. 21 is a cross-sectional view of modular mated walls of adjacent receptacles, with a simplified fastening means therebetween shown in elevation.

Referring to the drawing, particularly FIG. 1, one type of basic storage receptacle as contemplated by the invention will first be described. This basic storage receptacle has one entire side thereof open (but for the thickness of the walls defining the opening) for access to the interior thereof. Of course, if desired, a short optional flange may extend inwardly from the perimeter defined by wall edges; but this is not preferred and adds unnecessarily to the structure. This receptacle has exactly five outer walls 10, 11, 12, 13 and 14. Its five walls are permanently united together. It further has exactly eight outwardly-facing square module surface areas on those five walls. Optionally, more than eight outwardly facing square module surface areas may be provided; but at least eight are critical and exactly eight represent the preferred embodiment for this basic receptacle.

The five outer walls for this type of storage receptacles illustrated in FIG. 1 consist of the two parallel oppositely-disposed square end walls 10 and 11, and the three perpendicularly contiguous rectangular connecting walls 12, 13 and 14. These rectangular connecting walls 12, 13 and 14 extend longitudinally between the square end walls 10 and 11, and are terminally united perpendicularly to each of the square end walls 10 and 11 along three edges thereof.

It is the overall perpendicular relationship of the walls that is important. Joints may be between butt ended surfaces, or may be between beveled surfaces, as desired. Indeed, in practice, the entire receptacle may be molded as a single unitary body in plastic, without apparent joints per se. Nevertheless, the walls of such an article are in fact joined or united at corners in the manner common for molded articles. Each end of a receptacle (e.g. the square end walls 10 and 11) has a square outer surface area which, in terms of its perimeter size, consists exactly of one square module surface area; thus, a square module surface area is defined as the planar area encompassed by the outer perimeter edges of an end of a receptacle such as formed by an end wall 10 or 11. Each side of the receptacle as formed by connecting walls 12, 13 and 14 has a rectangular outer surface whose planar area, within the limits of the outer perimeter edges of the side, consists of two adjacent square module surface areas. In effect, the volume defined by outer wall planes of a receptacle is that of two adjacent cubes. Illustratively, the perimeter dimensions of the outer surface of each square end wall 10 and 11 are eight inches by eight inches, with the perimeter dimensions of the outer surface of each rectangular wall surface eight inches by sixteen inches (i.e., length twice as long as width). The dimensions of the opening in the open side of the storage receptacle are reduced by the thickness of the walls; but to be noted is that the size of the open side of the receptacle, in terms of planar area across that open side from outer edge to outer edge of the walls defining the opening (i.e., the open side "surface" area), corresponds to the back or medial connecting wall 12 outer surface (as well as to the outer surface of laterally contiguous connecting walls 13 and 14).

(So as to reduce the complexity which would be created by using different numbers for each wall of each receptacle, the numbering for corresponding parts of different receptacles is frequently maintained the same in making this disclosure, with a distinctive alphabet letter added to distinguish different individual receptacles.)

Means 15, such as, for example, illustrated more specifically in FIG. 13, disengageably fasten module surface areas of different receptacles together. In FIG. 1, this means 15 disengageably unites one module surface area of lateral connecting wall 14 of one receptacle to the module surface area at the end wall 10A of another receptacle. Likewise, the lower modular surface area of wall 14 is disengageably united by means 15 to the modular surface of end wall 10B. Similar means 15 disengageably fasten both module surface areas of wall 13A to both modular surface areas of wall 14B. These walls 13A and 14B are in face-to-face relationship in the showing of FIG. 1.

Any modular surface area of one receptacle may be disengageably fastened to any modular area of another receptacle. Thus, receptacles may be placed end-to-end and fastened to form a long shelf or display structure. They may be fastened in step-wise fashion to form a simulated set of steps or a pyramid. An almost endless variety of arrangements are possible.

Referring to FIG. 13, suitable fastening means 15 may consist of a cooperative bolt 16 and nut 17. The heads 18 and 19 of each are recessed in a cavity or recess 20 (a preferable but optional feature) which extends into the inner surface portion of the walls 10C and 11D of adjacent receptacles (see FIG. 13). A central hole or opening or aperture 21 in each module area of receptacle walls is provided for the threaded member 16 and nut 17 to permit cooperative fastening. Thus, the storage receptacles are firmly joined together, but disengageably united; and this permits alteration of the modular arrangement for the receptacles in a utility center as one may desire.

Two storage receptacles 22 and 23, as illustrated in FIG. 2, are desirably united (e.g., in a manner such as aforedescribed) in back-to-back modular relationship to provide a low table or playing surface for young children, as well as to provide storage space for toys or games.

FIG. 3 illustrates four vertically oriented storage receptacles 24, 25, 26 and 27 united together in the manner taught herein, with the back rectangular panel (e.g., 28) of each disengageably fastened to a lateral rectangular panel (e.g., 29) of an adjacent receptacle. This provides a slightly higher table or playing surface as well as suitable storage space for toys, games, hobby equipment or the like. It also provides a utility center which may serve as a tea table or the like, since it is at approximately the correct height for that usage when storage receptacles of the preferred size are employed (e.g., end wall surfaces 8 inches square and elongated connecting wall surfaces 8 inches by 16 inches in size).

Further versatility for the combining of storage receptacles is illustrated in FIG. 4, where four receptacles 30, 31, 32 and 33 are united analogously to the showing in FIG. 3; and this assembly is joined to two receptacles 34 and 35 which form a base, with all modular surface areas mated and disengagably fastened together as taught herein.

FIG. 5 is included to illustrate a repetitive face-to-face connection of one modular surface area of a rectangular wall of a receptacle to an end modular surface area of a square wall of an adjacent receptacle. The repetitive arrangement of four such receptacles 36, 37, 38 and 39 provides a central passage through the entire utility center in this structure; and all receptacles are oriented to allow access into their interior for storage.

Other types of basic storage receptacles are also contemplated by the invention. For example, receptacles 40 and 41 (capable of being "basket" stacked one inside the other—or partially inside the other), as illustrated in FIGS. 6 and 7, are also useful in forming versatile modular mated groupings for utility centers or family entertainment centers. The type of storage receptacle here contemplated also has an open rectangular side which is, in terms of its outer perimeter dimensions (i.e., including the thicknesses of the edges of walls defining the opening), exactly two times as long as it is wide. (Optionally, the width perimeter dimensions of the open side of this type of receptacle may be reduced by the thickness of a plate or leveling member 42, as will be discussed in connection with FIG. 8; and this modification of size is preferred where maximum versatility of modular connection is desired for these receptacles of FIGS. 6–8 with those as illustrated in FIG. 1.)

These receptacles of FIGS. 6–8 inclusive also are characterized by having exactly five outer walls. These walls consist of two oppositely-disposed quadrilateral end walls 43 and 44 and three elongated contiguous quadrilateral connecting walls 45, 46 and 47 extending longitudinally between the end walls and terminally united to three sides or edges of each end wall 43 and 44. The medial (or rear or back) elongated connecting wall 45 is the only rectangular wall of these receptacles. One elongated connecting wall 46 lateral to the medial wall 45 is joined to the medial wall 45 at a right angle 48; that is, at a perpendicular orientation. The other wall 47 of the two lateral connecting walls (i.e., 46 and 47) is at an obtuse angle 49 to the medial wall 45; and this angle 49 is generally between about 94° (or 96°) and about 104° (or as large as 110° or even 120°) between the medial wall 45 and lateral wall 47. Normally, both end walls 43 and 44 are also joined to the medial wall 45 at obtuse angles, usually approximately one-half as great as the obtuse angle between the lateral wall 47 and medial wall 45. If desired, however, one end wall, such as wall 43, may be joined to medial wall 45 at a right angle, and the other end wall, e.g., 44, joined to medial wall 45 at an angle substantially equal to the obtuse angle between wall 47 and medial wall 45. It is the number of degrees in excess of 90° which represent the measure of the extent or magnitude of an obtuse angle; thus, an obtuse angle of 100° between a medial 45 and lateral 47 wall means that the preferred obtuse angles between a pair of sloped end walls 43 and 44 and the medial wall 45 will each be at about 95°. Both quadralateral end walls 43 and 44 are united to the lateral connecting walls 46 and 47 at right angles. Further, it will be noted that the quadrilateral end walls 43 and 44 each are characterized by having a shape having two right angle corners (both boardering the one connecting wall 46 perpendicularly joined to medial wall 45), plus one obtuse angle corner and one acute angle corner (the latter being located at the open side of the receptacle adjacent connecting wall 47).

A formula is useful to illustrate the preferred relationship between the obtuse angle of connection for the lateral wall 47 to medial wall 45 and the sum of the angles of connection for end walls 43 and 44 to medial wall 45. This formula may be stated as: The lateral wall 47 obtuse angle equals (i.e., substantially equals) the sum of the end wall 43 and 44 angles minus ninety degrees.

The relationship of the five panels or outer walls, 43 through 47, making up these receptacles of FIGS. 6–8 is such that the receptacles (each of identical character, that is, of identical size and shape) may be stacked one inside the other, as illustrated. Normally, at least the side walls 46 and 47 of receptacles stacked one inside the other as illustrated in FIG. 6 are no more than about one-eighth inch or possibly 3/16 inch (or in some cases 1/4 inch) thick. The elongated lateral wall 47 is sloped from the edge thereof adjacent the opening for the receptacle to the edge thereof united to the back or medial elongated wall 45; and this slope is such that the outer width of the elongated back or medial wall 45 of the receptacle is at least approximately one fourth inch up to about one inch less than the total width (i.e., including wall edges) for the plane across the side of these receptacles characterized as the open side. Further, in a similar manner, at least one of the end walls 43 and 44 of these receptacles (and generally both end walls to an equal extent) slopes from the edge thereof defining the opening toward the back or medial panel 45. In short, the length of the outer surface of medial wall 45 is short of the length of the open side "surface" of these receptacles an amount substantially equal to the amount by which the width of the outer surface of the medial wall is short of the width of the open side "surface." All of this permits the stacking relationship, as illustrated.

A special leveling plate member 42 for these alternate receptacles is illustrated in FIG. 8. At one edge of this plate, a leg 42A or flange is provided as a rest member for abutting against the portion of the outer surface of the one lateral wall 47 at its connection to the medial wall 45. This plate 42, with its leg 42A, effectively forms a flat surface which is parallel to the opposite elongated lateral wall 46 of the receptacle. Optionally, lip members 50 and 51 (as shown in FIG. 8) may be added as part of the structure of plate 42, to provide means which overlap edges of the base receptacle to "lock" the plate 42 against shifting movement; but this feature (i.e., one or both of lips 50 and 51) generally will be omitted where bolt fastening of adjacent receptacles is contemplated. Lips 50 and 51 may extend both downwardly and upwardly beyond the plane of the plate member 42 itself, so as to "lock" and yet permit modular stacking and holding of this type of receptacle one on top of the other to form a bookcase or the like. It will be appreciated that elongated lids such as plate 42 may be employed to form from one to six or more module surface areas, or to cover areas of a size which, when converted to modular surface areas by the plate 42, form from one to six or more such modular surface areas. This concept of modulation for the receptacles of FIGS. 6–8 will now be discussed.

The modified type of receptacles as illustrated in FIGS. 6–8 also may be disengageably united in modular fashion to form a utility center. However, since several of the walls of these receptacles are sloped, a module converting plate (such as, for example, the leveling plate 42) is generally employed to convert such sloped walls as 43, 44 and 47 into walls exhibiting proper modular mating characteristics. No "converting" plate is necessary for the modular mating of perpendicular walls or walls common to a cube surface (e.g., those walls numbered 45, 46—and optionally one end wall such as wall 43 or 44 where one of the end walls is perpendicular to the medial wall 45. Thus, the wall surfaces over which a module converting plate is employed for the modular connections between receptacles will be noted to be those which are united to the medial (or back or base) wall 45 at obtuse angles. The function of the module converting plate 42 is to form a surface perpendicular to the medial wall 45. Mating holes or apertures 52 and 53 (e.g., centrally located for an assumed modular surface area such as an 8 x 8 inch square area) are suitably provided for positively but disengageably fastening receptacles of this type together to form a utility center. To be noted is the fact that, in the perpendicularly oriented walls 45 and 46, the mating holes for modular uniting are so spaced as to match with holes or apertures centrally located in the module converting plate 42 (e.g., a plate 8 inches by 8 inches) for walls joined to the medial wall 45 at obtuse angles. In effect, the modular converting plate 42 serves to convert these receptacles into units which exhibit the modular surface area mating characteristics of the receptacles illustrated in FIG. 1.

Referring now to FIG. 9, four storage receptacles 54, 55, 56 and 57, of the basic type as illustrated in FIG. 1, are disengageably fastened or held in structural relationship to each other by means of an intervening plate member 58 having a perpendicular peripheral flange 59 at the perimeter of the plate 58. Additionally, a plate 60 having a perimeter depending lip or flange 61 (i.e., a lip edge extending perpendicularly a quarter inch or even up to one inch in one direction from the plane of the plate 60) is employed as the top cover member and a "fastener." Likewise, a similar plate (not visible in FIG. 9) with a perimeter lip flange 62 serves as a base member contributing also to the maintenance of the receptacles in the structural arrangement illustrated. Further, as illustrated in FIG. 9, the top plate 60 for this structure may comprise a game board 63 of any suitable character as desired. The plate 60 may optionally be transparent so as to permit the game board to be positioned thereunder. In such cases, the game board 63 may be printed on thin flexible material such as paper or light cardboard. Thus a variety of games may be played on the same surface with convenience and economy. The game board 60 could also be altered so as to receive a variety of puzzles designed to fit one or more cavities in it. In games requiring auxiliary equipment of a uniform nature, it may be desirable to incorporate this equipment in the game board 60. One such piece of equipment or device would be a spinner of the type usually employed with children's games. In the case of such a spinner becoming a permanent fixture of the game board, the numbered surface of the spinner could be changed at will to correspond to the game selected; or a series of annular rings of different needed indicia may be permanently printed or otherwise marked on the board 60 about the axis of mounting for the spinner.

The showing in FIG. 10 is that of two groups of three storage receptacles stacked on top of each other and serving as supports for ends of a plate 64. The entire structure simulates that of a desk or work bench, with three receptacles 65, 66 and 67 at one end and three 68, 69 and 70 at the other. Additionally, a special additional shelf 71, a divider 72 and a set of drawers 73 (suitably supported and separated by a web network of dividers which form a separate space for each drawer) are shown inserted in the receptacles 68, 69 and 70 respectively.

A variety of means are provided for disengageably fastening receptacles together to form utility centers. FIGS. 11 and 12 illustrate one type. The showing in FIG. 11 is that of a dovetailed groove 74 extending a significant distance (and suitably entirely) across a wall member 75 on the outer modular mating part thereof. Preferably, such a groove 74 extends on the outer surface from the edge of a wall member 75 (e.g., centrally on edges such as adjacent the opening of a receptacle); and as aforenoted, this groove extends at least a significant fastening distance (e.g., at least about one-fourth inch and suitably more) across the modular mating surface. Placing two such grooves in alignment with each other (see FIG. 12), as done when mating the modular surface areas of walls 75 and 76 of adjacent receptacles (e.g., with their open sides in the same direction), forms a dual dovetail configuration as illustrated in FIG. 12. A dual dovetailed splint 77 then is inserted for uniting the mated modular surface areas together.

A further alternate fastening or holding means is that of a bolt 16 and nut 17, as illustrated in FIG. 13. Both the bolt 16 and nut 17 are suitably provided with heads 18 and 19 (preferably disk-type in nature), with each having a screw-driver slot for use in the fastening operation. The head members preferably recess into circular recesses or concavities as preferably, but optionally, provided at the interior surface of the walls of the receptacles.

FIGS. 15 through 18 illustrate modular surface areas 78 and 79 configured into mating male 80 and female 81 parts for interlocking, and equipped with apertures or openings 82 through which a fastening means (such as a bolt and nut) may be placed. Specifically, a non-symmetrical or square convex male part 80 projecting outwardly from one modular surface area 78 mates with a matching non-symmetrical concave female depression 81 into another modular surface area 79 for interlocking to prevent rotation of the modular connected walls 78 and 79 with respect to each other.

As illustrated in FIG. 18, a U-shaped channel or continuous C-clamp piece 83, suitably of plastic or metal (e.g., suitably as described in United States Letters Patent No. 3,225,952, here incorporated by reference), is employed as a fastening means over the edges (optionally rabbet grooved, as illustrated) of adjacent wall members 84 and 85 of receptacles oriented with their open sides facing in the same direction. To be noted, however, is the fact that this type of fastening means may also be employed between receptacles oriented with their openings facing in different directions; and such is made possible, as illustrated in FIGS. 3 and 19, by adding a groove 86 about the outer wall surface 87 of a receptacle at a location spaced from the perimeter edge thereof. One leg 88 of channel clamp 83 fits into groove 86 and the other leg extends over the edge of a wall at the opening of the adjacent receptacle. U-shaped channel pieces may be used alone or in combination with other fastening means to hold receptacles in modular orientation in a utility center.

Still further, snap-type fastening means may be employed. One such snap-type fastener is illustrated in FIG. 20; and consists of a pair of buttons or heads 90 and 91 carrying mating male 92 and female 93 elements, preferably of plastic. Another snap fastening arrangement is illustrated in FIG. 21. It comprises a single "dumb-bell" shape 94 with oppositely projecting enlarged parts 95 and 96 which interlock into contoured recesses in mated modular walls 97 and 98. To provide greater ease of snap fastening, either element of the snap connection may be slit so as to yield during the snap affixing and parting steps.

It will be appreciated that a variety of arrangements are possible for the holes (or recesses) in the modular walls of the receptacles while still retaining the modular critically as described. Thus, it is possible to employ a trigulation of holes (or recesses) or a square pattern. But by far the most economical is that of one hole (or simply a blind recess where snap fasteners such as illustrated in FIG. 21 are employed) centrally located in a modular area for fastening purposes, with any number of optional additional holes (e.g., a peg board design), or with other structures present, for decorative or other purposes.

Although the walls of the receptacles may be formed of wood, plastic, metal, cardboard or a variety of other materials, by far the most preferred material to employ is an organic plastic (such as thermoplastic polyethylene, preferably high-density polyethylene, or polypropylene, or polystyrene, or polycarbonate, or even thermoset-type plastics such as phenol-formaldehyde resins.) Plastic materials in particular, however, lend themselves to being permanently colored, especially in the bright shades, and are able to withstand all types of weather and handling to which the receptacles are likely to be subjected. Wall thicknesses, especially where plastic is employed, are suitably maintained at a level of one-eighth inch or at least about one- eighth inch (or about 4 or 5 millimeters) up to about one-half inch (or about one or 1.5 centimeters). Thinner walls (e.g., 0.05 inch or about one millimeter thick may, of course, be useful for limited purposes. Generally, the most versatile overall size for receptacles is that from modules of about 8 inches (20 centimeters) and multiples thereof (e.g., 16 inches or 40 centimeters). However, 6 inches or 12 inches and multiples thereof (e.g. length of 12 inches or 24 inches respectively) are also useful sizes, but not as versatile in terms of serving as storage spaces for a wide variety of objects of the normal size most characteristic for games, books, objects of art and the like.

As set forth in this specification, the Family Entertainment Centers employ various combinations of modular receptacles to provide a systems approach in the broad areas of games, arts, toys, hobbies and crafts. Flexibility is such that the system may be used by all members of the family i.e. all age groups. Receptacles may be rearranged from time to time with a minimal amount of effort. A special application of this flexibility is the systems ability to grow with a child as he gets older and as his interests change. To the merchant, the basic receptacles of the system offer a convenient means for merchandising various types of goods. In the hands of other users, they are primarily employed for storage, display, play areas and as components of various types of furniture. Because of the inherent durability of the individual units and various combinations, thereof, a longevity and modular convenience is imparted which heretofore has not been available in connection with game or hobby merchandise—the latter having been characteristically heretofore marketed on a haphazard basis in containers of all types and configurations.

Thus, the individual receptacles lend themselves to the marketing of conventional toys, games, books, crafts and hobbies in an orderly and planned fashion. Educational units may be designed for various activities and subjects. It is possible, for instance, to design companion modules around a central theme (such as science and history). In this manner, individual units are employed to market, store, and implement the play of currently available entertainment activities for all age groups. Such activities encompass card playing, chess, checks, puzzles, work area, study area, playing surfaces, supplies for various activities and building blocks. In the area of hobbies, separate units can be devised for individual hobbies such as stamps, coins, shells, artist supplies, and the like. They also can be arranged for display and storage of hobby-oriented activities such as model cars, small collectors items, and the like. In the area of crafts, they are especially useful as storage areas for tools and supplies. In the toy field, it is possible to design the individual items so that the modules lend an element of durability and permanence not currently available.

From a marketing standpoint, it is possible to sell the "Family Entertainment Center" as individual units or as a system. Because of the various features as set forth above, the items lend themselves to being merchandised in exiting stores, especially food, drug and specialty stores. However, a new type of specialty store could be employed to sell only "Family Entertainment Center" merchandise. Further, articles according to the teaching herein also lend themselves to being marketed by mail or on a "door to door" basis.

It will be appreciated that the receptacles can be sold by themselves or in combination with various merchandise as set forth above. The various auxiliary items, especially those designed to complete an article of furniture (such as table, play area, desk, bench, chair or other supporting pieces) will generally be sold as separate items. In this manner, exceptionally great versatility of use for the basic receptacle and the other components of the system taught herein remains as a consumer benefit and a consumer election during the entire life of the components.

That which is claimed is:

1. A utility center comprising two or more storage receptacles disengageably fastened together, each having an open side which is rectangular, each having exactly five outer walls which are permanently united together and exactly eight outwardly-facing square module surface areas on said walls, said five outer walls consisting of two parallel oppositely-disposed square end walls and three perpendicularly contiguous rectangular connecting walls extending longitudinally between said square end walls and terminally united perpendicularly to each said square end wall along three edges thereof, each end of said receptacle having a square outer surface area which consists exactly of one square module surface area, each rectangular connecting wall side of said receptacle having a rectangular outer surface area consisting exactly of two adjacent square module surface areas, and means disengageably fastening any module surface area of any one receptacle in snug oriented face-to-face relationship to any module surface area of another said receptacle, whereby the modular arrangement of receptacles in said utility center may be altered at will.

2. The utility center of claim 1 wherein each square module surface area of each receptacle is equipped with a centrally-located module-mating hole extending through the wall thereof.

3. The utility center of claim 1 wherein the disengageable fastening means comprises interlocking members disengageably fastened through mated holes of module surface areas of two receptacles in modular juxtaposition.

4. The utility center of claim 1 wherein the disengageable fastening means comprises interlocking male and female means.

5. The utility center of claim 1 wherein the means for disengageably fastening module surface areas together comprises a U-shaped channel member.

6. The utility center of claim 1 wherein two receptacles are in back-to-back modular relationship.

7. The utility center of claim 1 additionally characterized by having a game board in association therewith, said game board being supported at a level for play activity by said receptacles of said utility center.

8. The utility center of claim 1 wherein each square modular surface area is eight inches by eight inches in size.

9. A utility center comprising a storage receptacle of a size and shape permitting one such storage receptacle to be stacked in the open side of another of identical character, said receptacle being characterized by having an open side which is rectangular, by having exactly five outer walls which are permanently united together, said five outer walls consisting of two oppositely-disposed quadrilateral end walls and three elongated contiguous quadrilateral connecting walls extending longitudinally between said end walls and terminally united to each said end wall along three edges thereof, the medial elongated connecting wall of said three contiguous connecting walls being the only rectangular wall of said receptacle, one of said connecting walls lateral to said medial wall being at a right angle to said medial wall and the other of said connecting walls lateral to said medial wall being at an obtuse angle between 94° and 120° to said medial wall, both of said end walls being at an angle of at least 90° to said medial wall, with at least one of said end walls being joined to said medial wall at an angle in excess of 90°, each said quadrilateral end wall being united to each of said lateral connecting walls at a right angle, said one lateral wall of siad receptacle and said end walls of said receptacle joined to said medial wall at an angle in excess of 90° being all adapted to receive a plate to provide for modular connection of said receptacle to other such receptacles of identical character.

References Cited

UNITED STATES PATENTS

| | | | |
|---|---|---|---|
| 2,511,949 | 6/1950 | Simon | 312—111X |
| 3,000,680 | 9/1961 | Zelenko | 312—111 |

FOREIGN PATENTS

| | | | |
|---|---|---|---|
| 1,544,144 | 10/1968 | France | 312—111 |

PATRICK D. LAWSON, Primary Examiner